United States Patent [19]
Zitzmann

[11] Patent Number: 5,900,135
[45] Date of Patent: May 4, 1999

[54] METHOD OF PRODUCING COMPONENTS ON A METAL FILM BASIS

[75] Inventor: Heinrich Zitzmann, Lauf an der Pegnitz, Germany

[73] Assignee: Sensotherm Temperatursensorik GmbH, Nuremberg, Germany

[21] Appl. No.: 08/750,298

[22] PCT Filed: Mar. 29, 1996

[86] PCT No.: PCT/EP96/01396

§ 371 Date: Dec. 5, 1996

§ 102(e) Date: Dec. 5, 1996

[87] PCT Pub. No.: WO96/31887

PCT Pub. Date: Oct. 10, 1996

[30] Foreign Application Priority Data

Apr. 5, 1995 [DE] Germany ............................ 19512813

[51] Int. Cl.⁶ ................................................... C25F 1/00
[52] U.S. Cl. ...................... 205/717; 205/718; 205/723; 205/766; 205/769; 29/423
[58] Field of Search ..................... 205/687, 717, 205/718, 723, 766, 769; 29/423; 427/124, 125, 126.2, 597

[56] References Cited

U.S. PATENT DOCUMENTS

| | | | |
|---|---|---|---|
| 4,053,977 | 10/1977 | Simon et al. | 29/620 |
| 4,568,413 | 2/1986 | Toth et al. | 156/151 |
| 5,507,926 | 4/1996 | Keller et al. | 205/717 |

FOREIGN PATENT DOCUMENTS

| | | |
|---|---|---|
| 2344940 | 10/1977 | France . |
| 2302615 B2 | 1/1973 | Germany . |
| 2507731 B2 | 2/1975 | Germany . |
| 2344940 | 3/1976 | Germany . |
| 2706789 A1 | 2/1977 | Germany . |
| 3927735 A1 | 2/1989 | Germany . |
| 4113483 A1 | 4/1991 | Germany . |
| 4218938 A1 | 6/1992 | Germany . |

OTHER PUBLICATIONS

G. Deidel, "Gedruckte Schaltungen"; Verlag Technik, Berlin, Berliner Union, Stuttgart, 1959, S. 50–55, 117–125, 136–137. No Month.

E&I 107. Jg. (1990) No. 5, ppS. 271–275). "Sensorin in Schichttechnik". Ernst Luder, Traugott Kallfas, No Month.

etz Bd. 109 (1988). H 11.S. 502–507. "Dunn–und Dickschichttechnologien fur die Sensorik," Jorg Muller. No Month.

DE–Patentanmeldung S39021 VIb/32b, Anmeldetag 5. mai 1954, bekanntgemacht am 20. Oct. 1995. no Month.

"der elektromeister +deutsches elektrohandwerk", de 29/31, S. 171g. (No Date).

Moeller "Leitfaden der Elektrotechnik," Bd. I. Grundlagen der Elektrotechnik, B.G. Teubner Verlagsgesellschaft mbH. Stuttgart, 1966, S. 66–75.

"Sensoren fur die Sauerstoffmessung," de 23/91–171g, gig (no date).

*Primary Examiner*—Arun S. Phasge
*Attorney, Agent, or Firm*—Wolf, Greenfield & Sacks, PC

[57] ABSTRACT

A method of producing components, which include a metal film on a carrier, comprises the following steps: applying a metal film to a first carrier; structuring the metal film; reducing an adherence between the first carrier and the metal film by electrically conductive contacting of the metal film; immersing the first carrier with the metal film in an aqueous electrolyte solution; immersing an electrode in the aqueous electrolyte solution; and applying a voltage between the metal film and the electrode; applying a second carrier to the metal film; and removing the second carrier with the metal film from the first carrier.

33 Claims, 5 Drawing Sheets

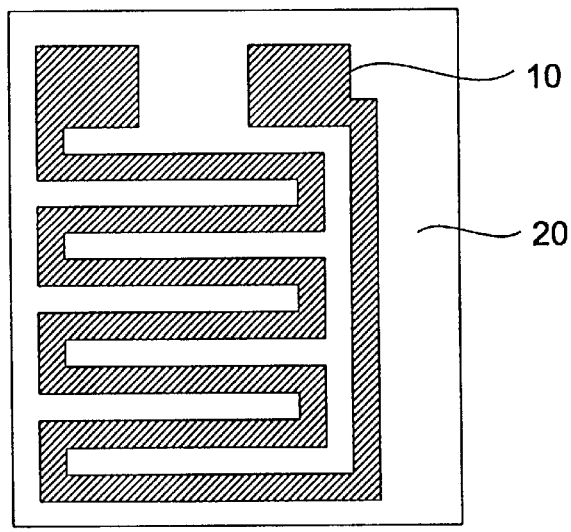
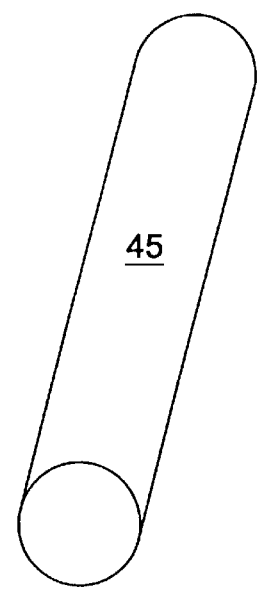
Fig. 4-1  Fig. 4-2
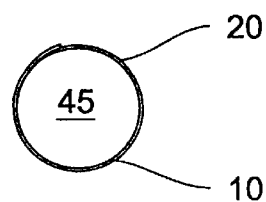
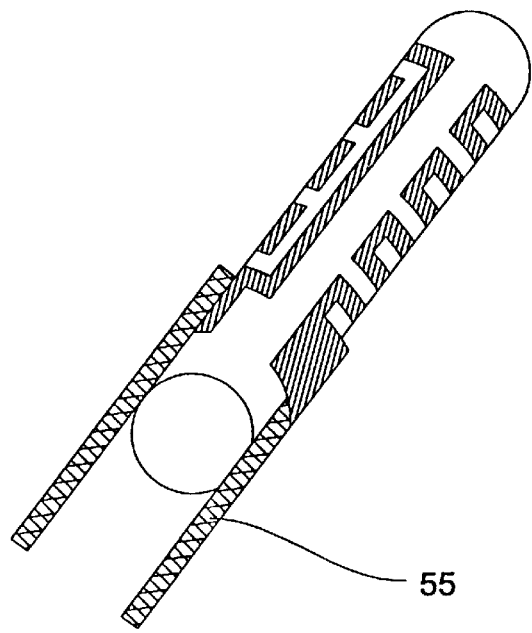
Fig. 4-3  Fig. 4-4

METHOD OF PRODUCING COMPONENTS ON A METAL FILM BASIS

This application is a 371 of PCT/EP96/01396 filed Mar. 29, 1996.

FIELD OF THE INVENTION

The present invention refers to a method of producing components on a metal film basis and especially to a method of producing components consisting of a metal film which is applied to a carrier.

BACKGROUND OF THE INVENTION

Typical components of the above-mentioned type are sensors, such as foil-type platinum temperature sensors, which are generally known and which are used for various purposes. The known platinum temperature sensors are constructed such that a thin platinum wire is glued onto a carrier foil in a meander pattern, said carrier foil consisting e.g. of Kapton. The production of such a sensor is very labour intensive. Further restrictions and drawbacks result from the fact that, even if the foils used have comparatively large dimensions, in the range of a few square centimetres, the wire thicknesses that can be processed permit only low resistance values, in the range of 100 Ohm or less. In addition, small dimensions, e.g. <1 cm$^2$, with normal resistance values in the range of 100 Ohm cannot be realized at all.

It is known to produce foil temperature sensors with ignoble metals, e.g. nickel, since the metal films can in this case be structured by normal methods after having been coated onto the carrier foil. Such methods include the photoresist technique and chemical etching. The disadvantage which has to be put up with in this connection is that the characteristic of the temperature sensors produced in this way does not comply with the widespread standard DIN IEC. In addition, ignoble metals do not have the high long-term stability of platinum.

Platinum temperature sensors must be subjected to temperature treatments at high temperatures, if possible above 1,000° Celsius, during and/or after the production of the platinum film so as to have a desired stability with regard to their characteristic, which is characterized by their resistance at 0° Celsius, $R_o$, and the temperature coefficient of the resistor, TK.

However, a foil coated with a metal film cannot be subjected to this treatment, since the carrier foils, which consist of Kapton, metal foils with an insulating coating, glass foils, etc., would be destroyed at these high temperatures. In addition, structuring of a platinum film which is applied to a foil is problematic, since the noble metal platinum can only be etched by very agressive media. Furthermore, foil carriers make it difficult to carry out the necessary trimming process for calibrating the resistors to the desired target values, said trimming process being carried out e.g. by means of exposure to laser radiation.

DE 25 07 731 B2 discloses a measurement resistor consisting of an insulating body as a carrier and of a thin platinum layer as resistance material. This measurement resistor is produced by applying a thin platinum layer to the carrier by cathode sputtering in an oxygen-containing atmosphere, said platinum layer being annealed subsequently. In the case of the method disclosed in this publication, the carrier must resist the high temperatures occurring during the annealing process.

DE 41 13 483 describes a method of producing fine conductor tracks. According to one embodiment, the above-mentioned publication discloses a method including the step of applying a powder of electrically conductive material to sticky areas of an auxiliary surface which correspond to a conductor track pattern. Subsequently, the powder is burnt, whereby conductor tracks are produced which adhere only weakly to the auxiliary or intermediate carrier surface. Following this, the final carrier is applied to the burnt conductor track pattern under pressure, whereupon the carrier is separated from the auxiliary surface, the electrically conductive material sticking to said carrier.

The publication G. Seidel "Gedruckte Schaltungen", Verlag Technik, Berlin, Berliner Union, Stuttgart, 1959, discloses different production modes for printed circuits. In this connection, various printing techniques, electroplating techniques and foil etching processes are described.

DE 39 27 735 A1 discloses a radiation thermometer consisting of a meandrous thin-film resistor applied to a plastic foil. DE 23 02 615 B2 shows a temperature-dependent electric resistor and a method of producing the same. This resistor consists of a meandrous conductor track having a temperature coefficient other than zero, said conductor track being arranged on a thin insulating foil which is arranged on a rod having a cylindrical surface.

In "e&i", 107, volume (1990), No. 5, pages 271 to 275, different components, which are produced by means of a thick-film or a thin-film technique, are explained. In "etz", Vol. 109 (1988), No. 11, pages 502 to 507, thin-film and thick-film technologies used in the field of sensor technology are described.

DE 42 18 938 A1 discloses a method of producing resistor elements comprising the steps of applying a resistor path in the form of a polymerizable electrically conductive paste to a carrier and passing the coated carrier through an infrared oven so as to cause polymerization of said paste. Following this, a plastic core is pressed onto the coated carrier and the carrier is separated from said plastic core, which has the effect that the resistor path resulting from said conductive paste remains in said plastic core. German patent application S 39 021 VIb/32b, date of filing May 5, 1954, published on Oct. 20, 1955, discloses a method of increasing the adherence between metal coatings and glass or ceramics.

SUMMARY OF THE INVENTION

It is a primary object of the invention to provide a method of producing a component on a metal film basis whose characteristic corresponds to a desired characteristic.

According to a first aspect, the present invention provides a method of producing components including a metal film on a carrier, said method comprising the following steps:

applying a metal film to a first carrier;
structuring the metal film;
reducing an adherence between said first carrier and said metal film by the following steps:
electrically conductive contacting of the metal film;
immersing the first carrier with said metal film in an aqueous electrolyte solution;
immersing an electrode in said aqueous electrolyte solution; and
applying a voltage between said metal film and said electrode;
applying a second carrier to said metal film; and
removing said second carrier with said metal film from said first carrier.

According to a second aspect, the present invention provides a method of producing components including a metal film on a carrier, said method comprising the following steps:

applying a metal film to a first carrier;

structuring the metal film;

reducing an adherence between said first carrier and said metal film by the following steps:

electrically conductive contacting of the metal film;

immersing the first carrier with said metal film in an aqueous electrolyte solution;

immersing an electrode in said aqueous electrolyte solution; and applying a voltage between said metal film and said electrode;

applying a second carrier to said metal film; and removing said second carrier with said metal film from said first carrier; and applying the metal film, which has been applied to said second carrier, to a third carrier.

The present invention is based on the idea of producing the metal film up to a certain production step by means of a known thin-film or thick-film technique on a conventional carrier material, which is here referred to as first carrier, transferring the metal film, which has already been annealed and, normally, structured and trimmed, together with the first carrier to a second carrier, and detaching the first carrier subsequently.

The second carrier can be used as a new carrier for the metal film or only as a transfer medium for transferring the metal film to another carrier.

BRIEF DESCRIPTION OF THE DRAWINGS

FIGS. 2A-1 to 3-2 show various embodiments of metal-film components which have been produced according to the present invention;

FIGS. 4-1 to 4—4 shows a cylindrical component and the constituent parts which have been used for producing the same.

DETAILED DESCRIPTION OF THE PREFERRED EMBODIMENT

The production method according to the present invention is now explained in detail on the basis of a preferred embodiment.

Figures 1, 1A:
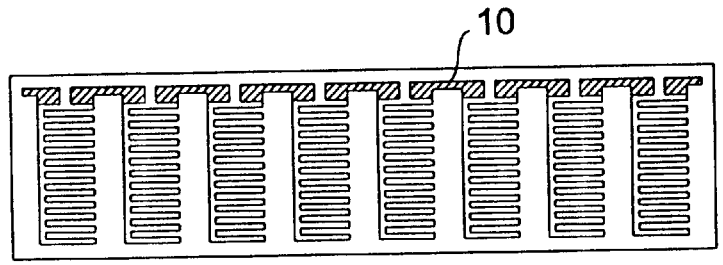
FIGS. 1A-1 to 1C-2 show various method steps in the production of a metal-film component according to the present invention.
Figures 1, 1A, 2:
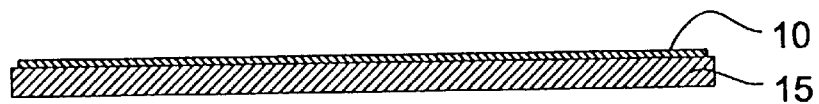
Figures 1, 1B:
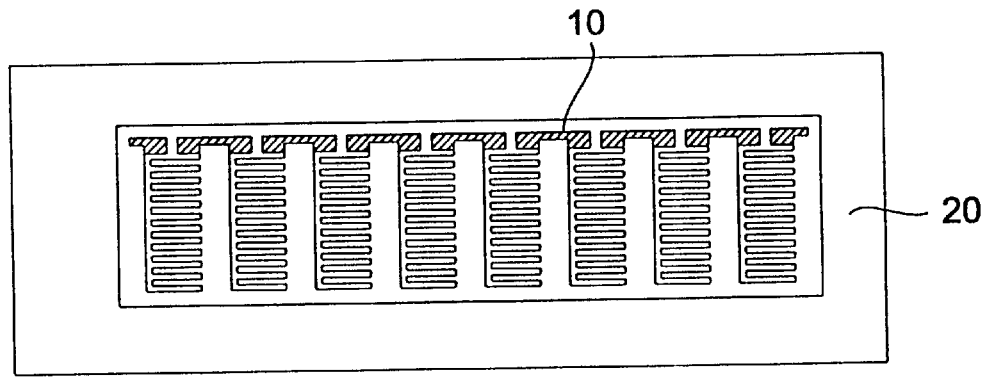
Figures 1, 1B, 2:
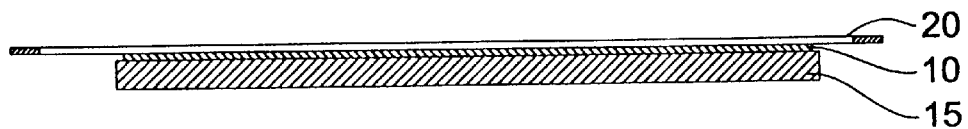

FIGS. 1A to 1C-1 each show top view and side views of a platinum film component after different method steps. As can be seen in FIGS. 1A-1 and 1A-2, a platinum film 10 is applied to a first carrier 15, which is e.g. a ceramic substrate. Instead of the ceramic substrate, it would also be possible to use a glass substrate or some other suitable carrier material. The platinum film is applied to the first carrier by means of a known thin-film or thick film technique.

After having been applied, the platinum film 10 is structured. This structuring can include temperature treatments at high temperatures (annealing processes), ion-beam etching processes for structuring the platinum film and exposure to laser radiation for trimming the platinum film, e.g. for calibrating the resistors to the desired target values.

Especially due to the temperature treatments, the platinum film has a certain adherence with regard to the first carrier; in connection with the preferred embodiment, said adherence is substantially reduced by a special method step. For this purpose, the first carrier 15 with the fully structured platinum film 10 is immersed in an electrically conductive solution. The electrically conductive solution is an aqueous electrolyte solution. Prior to immersing the first carrier 15 with the platinum film 10 in the electrically conductive solution, the platinum film 10 is contacted in an electrically conductive manner and forms, consequently, a first electrode. Furthermore, a second electrode is immersed in the solution.

Subsequently, a suitable voltage is applied between the two electrodes, whereby a corresponding current is produced in the electrochemical circuit. This causes a hydrogen gas formation on the platinum film 10 due to which the platinum film 10 will adhere less firmly to the first carrier 15. The platinum film 10 is then preferably cleaned in a rinsing process so as to wash away the chemical solution, whereupon it is dried.

The electrically conductive solution is preferably an aqueous electrolyte solution.

It is pointed out that electrolytes in general as well as in the sense in which this term is used in the present text represent a generic term for substances which are decomposed by electrolytic dissociation into individual substances and which, consequently, conduct current in the melt and in solutions. Hence, said electrolytes include salts, acids and bases. A distinction is made between genuine electrolytes, which are already present in the form of ions, such as e.g. NaCl, before they melt or go into solution, and the potential electrolytes, which only form ions when they go into solution, such as HCl.

In the electrolysis of an aqueous solution, which takes place in the present case, in addition to the dissolved electrolytes, the water, too, can take part in the electrode processes. This has the effect that hydrogen forms on the cathode, i.e. the negative pole, whereas, depending on the electrolyte used, chlorine or oxygen forms on the anode, i.e. the positive pole.

Experiments have shown that a loosening of the metal film from the substrate occurs in the case of both types of polarity, viz. when the metal film or the platinum film is used as a cathode or as an anode. This also means that loosening of the metal film 10 relative to the carrier 15 takes place not only when hydrogen forms on the metal film, i.e. when said metal film is poled as a cathode, but also when oxygen or chlorine forms on the metal film, i.e. when said metal film is poled as an anode.

The aqueous electrolyte solution used is preferably HCl or $HNO_3$, the metal film 10 being poled as a cathode so as to avoid a contamination of the metal film 10 e.g. by sodium when NaCl is used.

Figures 1, 1C:
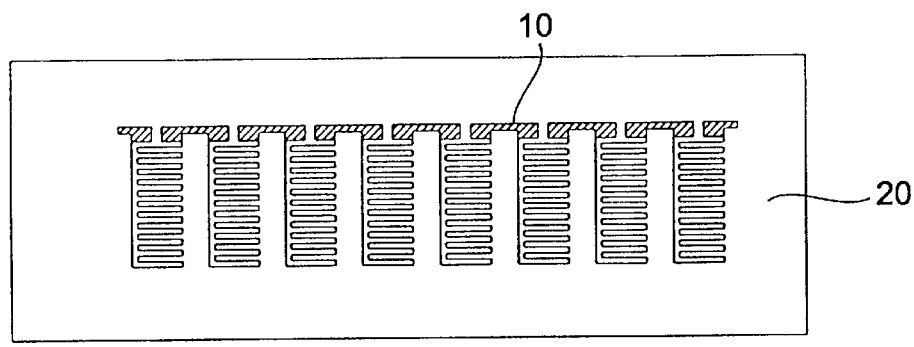
Figures 1, 1C, 2:
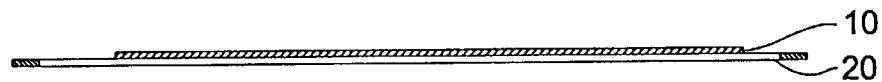

A metal film, which has been pretreated in this way and which is preferably a platinum film 10, has then applied thereto a foil 20 representing the second carrier. The foil 20 has a certain adherence whereby the platinum film 10 bonds to the foil 20. Following this, the foil 20, which constitutes the second carrier, is detached together with the platinum film 10 from the first carrier 15 by peeling off (FIGS. 1C-1 and 1C-2).

According to the preferred embodiment, the second carrier is preferably a foil. This foil preferably consists of a plastic material, such as Kapton, Teflon or polyimide. Alternatively, the second carrier can consist of a metal foil provided with an electrically insulating coating. Furthermore, the second carrier can be a special carrier made of a ceramic, glass, passivated silicon, etc.

The metal film can be applied to the first carrier as a planar layer by means of a thin-film technique. Known methods for this purpose are deposition by evaporation, deposition by sputtering, thin-film screen printing, etc. For producing the desired structures, the platinum film applied as a planar layer is then structured with different methods, e.g. ion-beam etching, exposure to laser radiation, etc. This course of action preferably makes sense for high-ohmic sensors on a small surface.

Alternatively, the metal film can be applied to the first carrier 15 as a resistance structure by means of a thick-film or thin-film screen printing technique. This is especially advantageous when the sensors in question are large-area sensors. In addition, the platinum film can also be formed on the first carrier by the combined effect of thin-film and thick-film techniques. In this case, the fundamental coating and the structuring can be carried out by means of a thin-film technique, whereas contact reinforcements which may be necessary are carried out by means of a thick-film technique. Furthermore, the metal film can already be provided on the first carrier with contact wires or contact ribbons; this is e.g. of advantage when the individual components are arranged in lines.

The second carrier can serve as a new carrier for the metal structure, this being advantageous when the arrangement is used as a foil temperature sensor. Alternatively, said second carrier can also be transferred to a further carrier with the aid of a "transfer-picture"-like technique. This technique can be used for integrating the metal structure in a silicon chip, which would not sustain the strain occurring e.g. during platinum film production.

Figures 1, 2A:
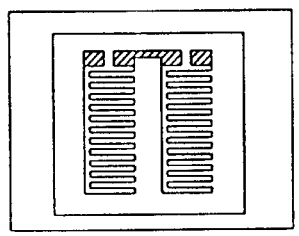
Figures 1, 2B:
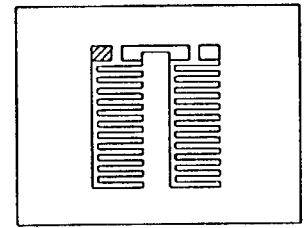
Figures 2, 2A:
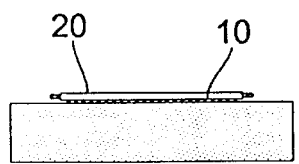
Figures 2, 2B:
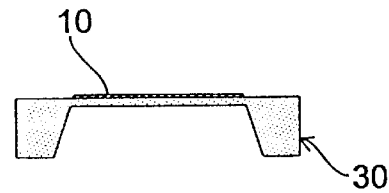

FIGS. 2A-1 and 2B-2 shows a metal film component in which the metal film 10 and the foil 20, which represents the second carrier, are applied to a third carrier, which can e.g. be a silicon chip or may, alternatively, consist of glass. As can be seen in FIGS. 2B-1 and 2B-2, this second foil can be removed after the application of the combination of metal film 10 and foil 20. The third carrier 30 now constitutes the new carrier for the metal film. This new carrier can now be subjected to further processing. For example, the third carrier can be etched on the back so as to reduce the carrier thickness (FIGS. 2B-1 and 2B-2). This is advantageous for producing a "fast" sensor, this type of sensor being used e.g. for detecting gas flows, e.g. for air quantity measurements in a motor vehicle.

If, as can be seen in FIGS. 2B-1 and 2B-2, the second carrier 20 has been removed after transfer of the metal film 10 to a third carrier 30, an "upper" protective layer can be applied to the platinum film in different ways. This protective layer can be applied e.g. by means of screen printing, sputtering or in the form of a counterfoil. In addition, said protective layer can consist of different materials.

Figures 1, 3:
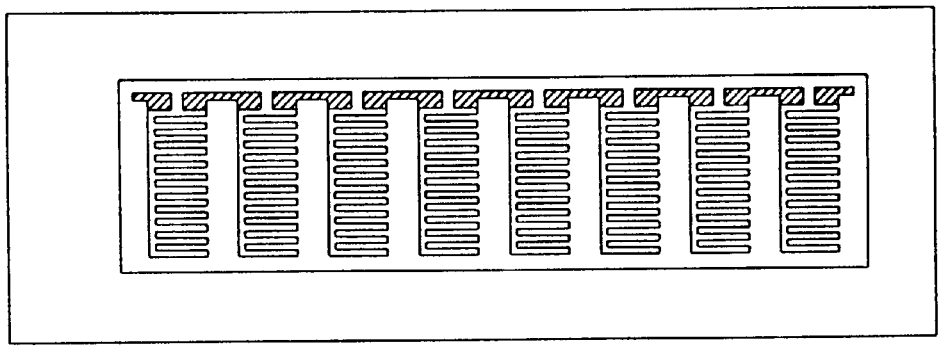
Figures 2, 3:
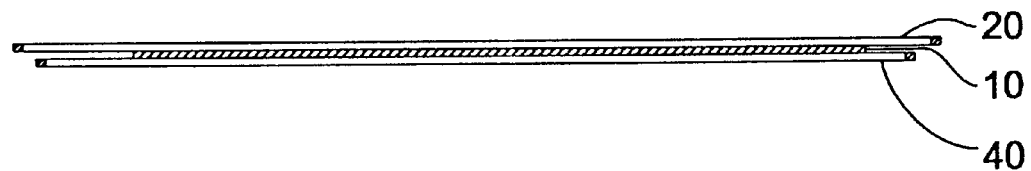

FIGS. 3-1 and 3-2 shows a metal film component in which the metal film 10 and the transfer foil 20, which constitutes the second foil, have been applied to a carrier foil 40. Also in this case, the second carrier, i.e. the transfer foil 20, can be removed after the application of the metal film to the carrier foil 40, or it can be left where it is.

The third carrier can have different forms. In accordance with the preferred embodiment, the third carrier (foil 40) is flat and it is coated on one side thereof with the metal film to be transferred. Alternatively, the flat third carrier can be provided with a coating on both sides thereof, i.e. on the front and on the back. In this case, identical or different metal films can be applied to the front and to the back. If different metal films are applied to the front and to the back, these metal films can differ with regard to material and structure.

In accordance with a further embodiment, which is shown in FIGS. 4-1 to 4—4, the third carrier has a cylindrical geometry. FIGS. 4-1 and 4-2 show in a separate condition and FIG. 4-3 shows in an assembled condition, the cylindrical carrier 45 constituting the third carrier and the foil 20 constituting the second carrier with the metal film 10 applied to the foil 20. In the assembled condition, the metal film is applied such that it covers the circumferential surface of the cylindrical carrier. Also in the case of this embodiment, the metal film can be covered with an outer protective layer after having been applied to the third carrier, said protective layer having e.g. the form of a thin-walled tube.

The third carrier and the protective layer can consist of identical or different materials, e.g. ceramics or glass. FIG. 4—4 additionally shows the radial contacting 55 of the cylindrical element, where the contacts are arranged on one side of the cylinder. Alternatively, it would also be possible to provide axial contacting, where the contacts are arranged in opposed relationship. Such a cylindrical component is normally referred to as circular sensor.

Figure 5:
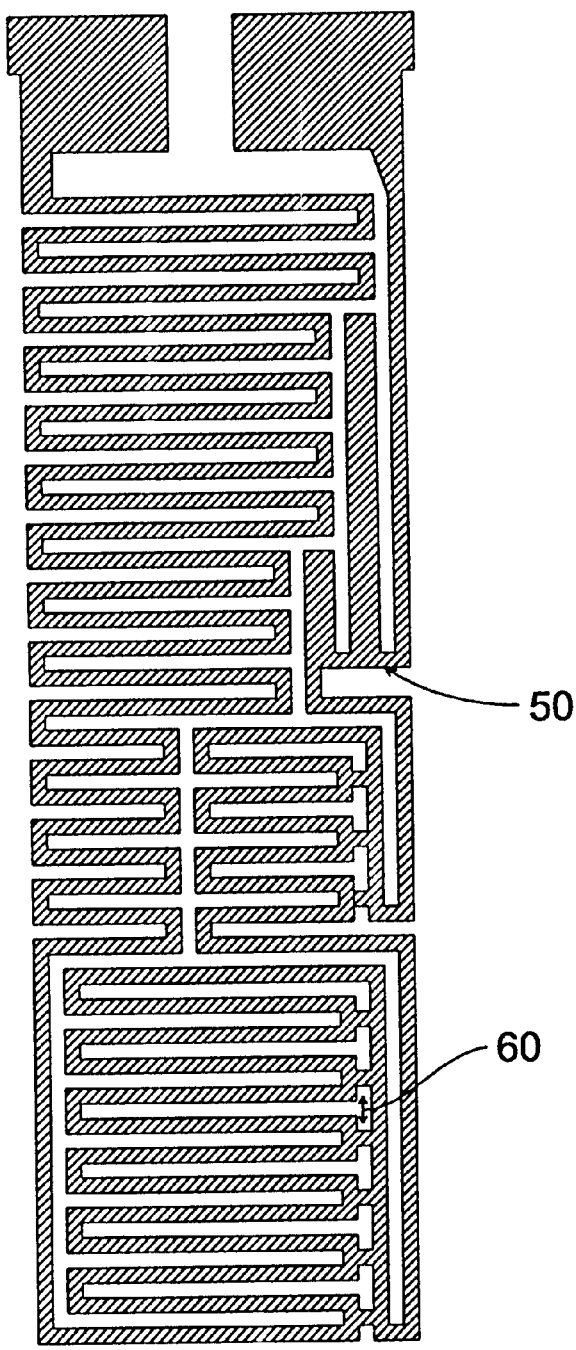
FIG. 5 shows a detailed representation of a metal-film structure in which trimming paths are marked.

FIG. 5 shows in detail a platinum film structure. Such a structure can be obtained during the step of structuring the metal film e.g. by ion-beam etching. In said structure, trimming points are set where fine trimming 50 or coarse trimming 60 can be carried out by exposure to laser radiation so as to calibrate the resistor to the desired target value.

Individual sensors produced by means of the method according to the present invention can consist of a resistor (platinum temperature sensor, heating element, etc.) or of an interconnection or combination of a plurality of individual elements. A plurality of individual elements is, for example, required for flow sensors, gas sensors, humidity sensors, etc. . The dimensions of the individual elements are typically between 20 and 50 mm. Dimensions deviating strongly from those mentioned are, however, possible as well.

Apart from platinum, rhodium or iridium, the metal film can also consist of platinum alloys, e.g. platinum/rhodium, or of other metals, e.g. nickel, or other metal alloys.

I claim:

1. A method of producing components including a metal film on a carrier, said method comprising the following steps:
    applying a metal film to a first carrier;
    structuring the metal film;
    reducing an adherence between said first carrier and said metal film by the following steps:
        electrically conductive contacting of the metal film;
        immersing the first carrier with said metal film in an aqueous electrolyte solution;
        immersing an electrode in said aqueous electrolyte solution; and
        applying a voltage between said metal film and said electrode;
    applying a second carrier to said metal film; and
    removing said second carrier with said metal film from said first carrier.

2. A method according to claim 1, wherein the metal film is a platinum film.

3. A method according to claim 1, wherein the metal film is a rhodium film, an iridium film, a nickel film or a film consisting of alloys of these metals.

4. A method according to claim 1, wherein the first carrier is a ceramic substrate or a glass substrate.

5. A method according to claim 1, wherein the second carrier is a foil of plastic material.

6. A method according to claim 5, wherein the said plastic material is polytetrafluoroethylene or polyimide.

7. A method according to claim 1, wherein the second carrier is a metal foil provided with an electrically insulating coating.

8. A method according to claim 1, wherein the second carrier is a ceramic carrier.

9. A method according to claim 1, wherein the second carrier consists of glass or passivated silicon.

10. A method according to claim 1, wherein the metal film is applied to the first carrier by means of a thick-film technique as a structure or by means of a thin-film technique as a planar layer or as a structure.

11. A method according to claim 1, wherein the structuring of the metal film includes ion-beam etching.

12. A method according to claim 1, wherein the structuring of the metal film includes exposure to laser radiation.

13. A method according to claim 1, wherein the metal film is subjected to a temperature treatment at high temperatures prior to, during and/or subsequent to the structuring.

14. A method of producing components including a metal film on a carrier, said method comprising the following steps:

applying a metal film to a first carrier;

structuring the metal film;

reducing an adherence between said first carrier and said metal film by the following steps:
electrically conductive contacting of the metal film;
immersing the first carrier with said metal film in an aqueous electrolyte solution;
immersing an electrode in said aqueous electrolyte solution; and
applying a voltage between said metal film and said electrode;

applying a second carrier to said metal film; and removing said second carrier with said metal film from said first carrier; and applying the metal film, which has been applied to said second carrier, to a third carrier.

15. A method according to claim 14, wherein the metal film is a platinum film.

16. A method according to claim 14, wherein the metal film is a rhodium film, an iridium film, a nickel film or a film consisting of alloys of these metals.

17. A method according to claim 14, wherein the first carrier is a ceramic substrate or a glass substrate.

18. A method according to claim 14, wherein the second carrier is a foil of plastic material.

19. A method according to claim 18, wherein the said plastic material is polytetrafluoroethylene or polyimide.

20. A method according to claim 14, wherein the second carrier is a metal foil provided with an electrically insulating coating.

21. A method according to claim 14, wherein the second carrier is a ceramic carrier.

22. A method according to claim 14, wherein the second carrier consists of glass or passivated silicon.

23. A method according to claim 14, wherein the third carrier is flat and has applied thereto a metal film on one side or on both sides thereof.

24. A method according to claim 14, wherein the third carrier is cylindrical, the metal film being applied to the circumferential surface of said cylinder.

25. A method according to claim 14, wherein the third carrier consists of silicon.

26. A method according to claim 14, wherein the third carrier consists of glass.

27. A method according to claim 14, wherein, after the step of applying the metal film to the third carrier, the second carrier is removed from the metal film.

28. A method according to claim 27, wherein, after the removal of the second carrier a protective layer is applied to the metal film.

29. A method according to claim 28, wherein the protective layer is a foil or is applied by screen printing or sputtering.

30. A method according to claim 14, wherein the metal film is applied to the first carrier by means of a thick-film technique as a structure or by means of a thin-film technique as a planar layer or as a structure.

31. A method according to claim 14, wherein the structuring of the metal film includes ion-beam etching.

32. A method according to claim 14, wherein the structuring of the metal film includes exposure to laser radiation.

33. A method according to claim 14, wherein the metal film is subjected to a temperature treatment at high temperatures prior to, during and/or subsequent to the structuring.

* * * * *